US010666106B2

(12) United States Patent
Bauer et al.

(10) Patent No.: US 10,666,106 B2
(45) Date of Patent: May 26, 2020

(54) STATOR OF AN ELECTRIC MOTOR

(71) Applicant: Robert Bosch GmbH, Stuttgart (DE)

(72) Inventors: David Bauer, Asperg (DE); Patrick Heuser, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 376 days.

(21) Appl. No.: 15/525,361

(22) PCT Filed: Sep. 10, 2015

(86) PCT No.: PCT/EP2015/070753
§ 371 (c)(1),
(2) Date: May 9, 2017

(87) PCT Pub. No.: WO2016/074825
PCT Pub. Date: May 19, 2016

(65) Prior Publication Data
US 2017/0324293 A1    Nov. 9, 2017

(30) Foreign Application Priority Data

Nov. 11, 2014 (DE) .................. 10 2014 222 942

(51) Int. Cl.
*H02K 3/14* (2006.01)
*H02K 3/28* (2006.01)

(52) U.S. Cl.
CPC ................. *H02K 3/28* (2013.01); *H02K 3/14* (2013.01); *H02K 2213/03* (2013.01)

(58) Field of Classification Search
CPC .. H02K 3/00; H02K 3/04; H02K 3/12; H02K 3/14; H02K 3/16; H02K 3/18; H02K 3/20;

(Continued)

(56) References Cited

U.S. PATENT DOCUMENTS 6,455,971 B1 *  9/2002  Palma, Sr. ............... H02K 3/12
                                                         310/180
2008/0315707 A1   12/2008  Wobben (Continued)

OTHER PUBLICATIONS

International Search Report for Application No. PCT/EP2015/070753 dated Feb. 4, 2016 (English Translation, 2 pages).

*Primary Examiner* — Quyen P Leung
*Assistant Examiner* — Eric Johnson
(74) *Attorney, Agent, or Firm* — Michael Best & Friedrich LLP

(57) ABSTRACT

Stators are already known which in each case comprise an annular stator stack having grooves which are open towards an axis of the stator and in which an electrical winding is provided which comprises a plurality of winding branches. The plurality of winding branches each have a plurality of parallel wires for reducing the so-called skin effect. The parallel wires are arranged in the grooves, wherein the winding branches in their configuration each form a plurality of turns of a coil which are each part of an electrical coil, wherein a turn of a coil is formed in each case by two sides of a turn, lying in different grooves, of one of the winding branches and by a turn side connector which connects the two sides of a turn to one another. In electrical windings having parallel wires, an unfavourable wire position and a resulting linking of different magnetic flows may lead to disadvantageous compensating or circular currents which produce additional copper losses in the electric motor. In the stator according to the invention the compensating or circular currents in the parallel wires are avoided or at least decreased. According to the invention, the parallel wires (Z) which are arranged in the same groove (2) are in each case provided in a common groove section ($y_f$) of the respective channel (2) having a groove section height ($H_f$), wherein the groove section ($y_f$) in each case comprises, arranged one (Continued)

above the other in the radial direction, layered regions (y1 ... yn), wherein in each case the parallel wires ( ) which belong to the same side of a turn are arranged in the same layered region (y1 ... yn) of the groove section ($y_j$).

7 Claims, 6 Drawing Sheets

(58) Field of Classification Search
CPC ... H02K 3/28; H02K 15/0031; H02K 2213/03
USPC .................................. 310/198, 206, 208
See application file for complete search history.

(56) References Cited

U.S. PATENT DOCUMENTS

| 2011/0227444 A1* | 9/2011 | Scott ........................ H02K 3/28 |
| | | 310/208 |
| 2012/0274172 A1* | 11/2012 | Koga ........................ H02K 3/12 |
| | | 310/208 |
| 2014/0042862 A1 | 2/2014 | Ishigami et al. |

* cited by examiner

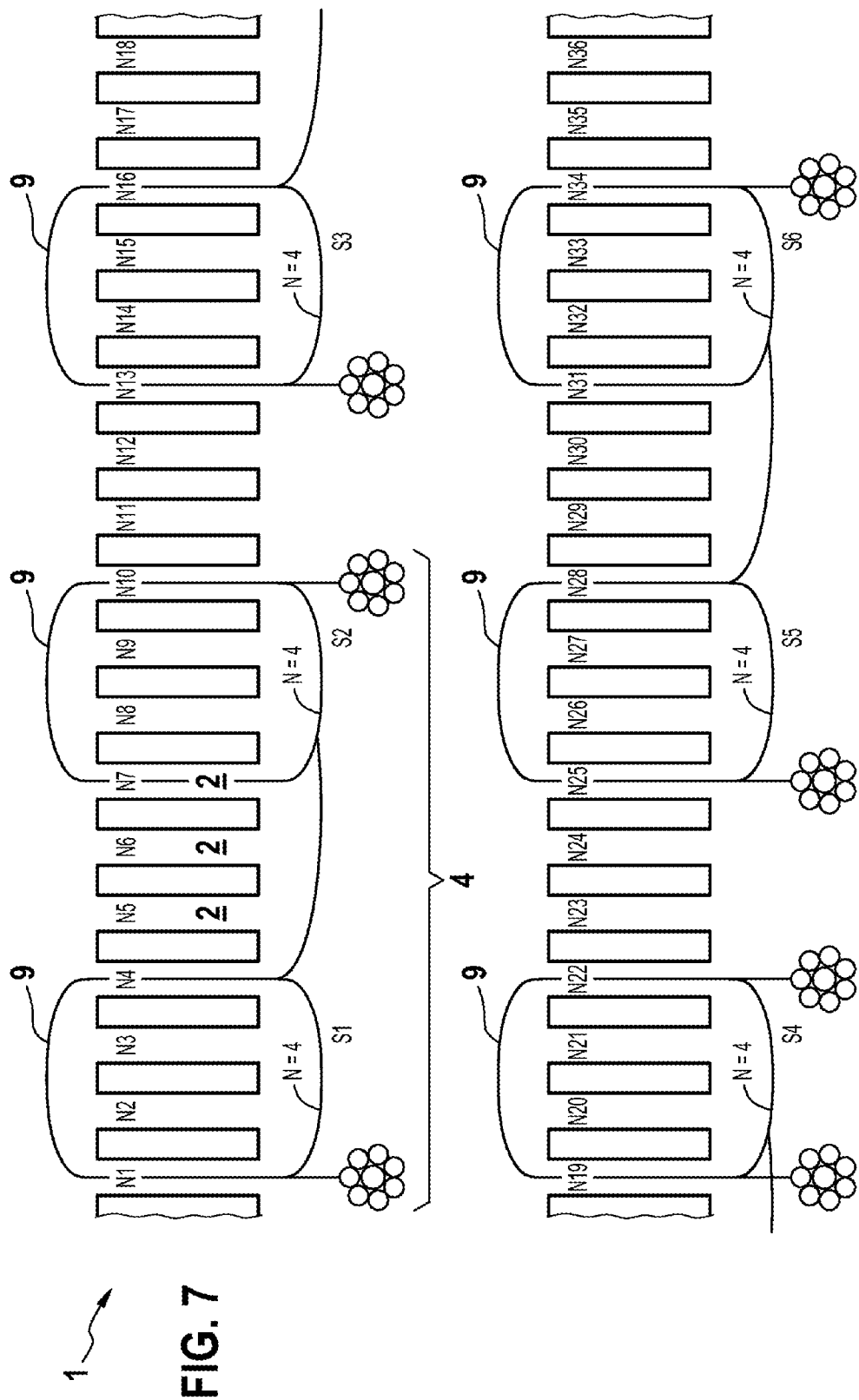

STATOR OF AN ELECTRIC MOTOR

BACKGROUND OF THE INVENTION

The invention relates to a stator of an electric machine.

Stators of electric machines having in each case an annular stator yoke are already known, wherein said stator yoke comprises slots that are open towards an axis of the stator and an electrical winding that comprises multiple winding branches is provided in said slot branches. The multiple winding branches comprise in each case multiple parallel wires so as to reduce the so-called skin effect. The parallel wires are arranged in the slots, wherein the winding branches in their extension form multiple coil windings that are in each case a part of the electric coil, wherein a coil winding is formed in each case by means of two winding sides of one of the winding branches, said winding sides lying in different slots, and by means of a winding side connector that connects the two winding sides to one another. In the case of electrical windings having parallel wires, the unfavorable wire position and a resulting inter-linking of different windings magnetic fluxes can cause disadvantageous compensating or circuit currents that produce additional copper losses in the electric machine.

SUMMARY OF THE INVENTION

The inventive stator of the electric machine has in contrast the advantage that the compensating or circuit currents are avoided or at least reduced in the parallel wires in that in each case the parallel wires that are arranged in the same slot are provided with a slot section height in a common slot section of the respective slot, wherein the slot section comprises in each case layered regions that are arranged one above the other in the radial direction, wherein in each case the parallel wires that belong to the same winding side are arranged in the same layered region of the slot section.

In accordance with one advantageous embodiment, the layered region comprises a radial height that is smaller than a value that is calculated from a factor multiplied by the ratio of the slot section height with respect to the number of the layered regions per slot section, wherein the factor lies in the range between 1.1 and 2 and the number of the layered regions of the respective slot section corresponds to the number of the winding sides that are arranged in the same slot. The layered region comprises in an advantageous manner in each case a width that corresponds to the width of the slots, where appropriate less the thickness of the slot insulation and/or less air gaps that are present between the slot and the slot insulation.

It is particularly advantageous if adjacent radial regions overlap with one another to a maximum extent at a predetermined percentage of their radial height. The smaller the percentage of the overlap, the smaller the compensating currents and the smaller the copper losses.

Furthermore, it is advantageous if multiple parallel winding branches of the same phase are provided, the winding sides of said winding branches being arranged in the slots in each case in different radial positions, wherein the different radial positions frequently occur uniformly in each parallel winding branch. The compensating or circuit currents in the parallel winding branches and consequently the additional copper losses are further reduced by means of distributing the winding sides uniformly in the winding branches.

BRIEF DESCRIPTION OF THE DRAWINGS

Two exemplary embodiments of the invention are illustrated in a simplified manner in the drawing and further explained in the description hereinunder.

FIG. 6 illustrates a sectional view of four slots in which the parallel wires of the electrical winding are arranged in accordance with a second exemplary embodiment and FIG. 7 illustrates a stator of an electric machine having slots in which winding branches of a single electrical phase of the electrical winding are arranged in accordance with the second exemplary embodiment.

DETAILED DESCRIPTION

Figure 1:
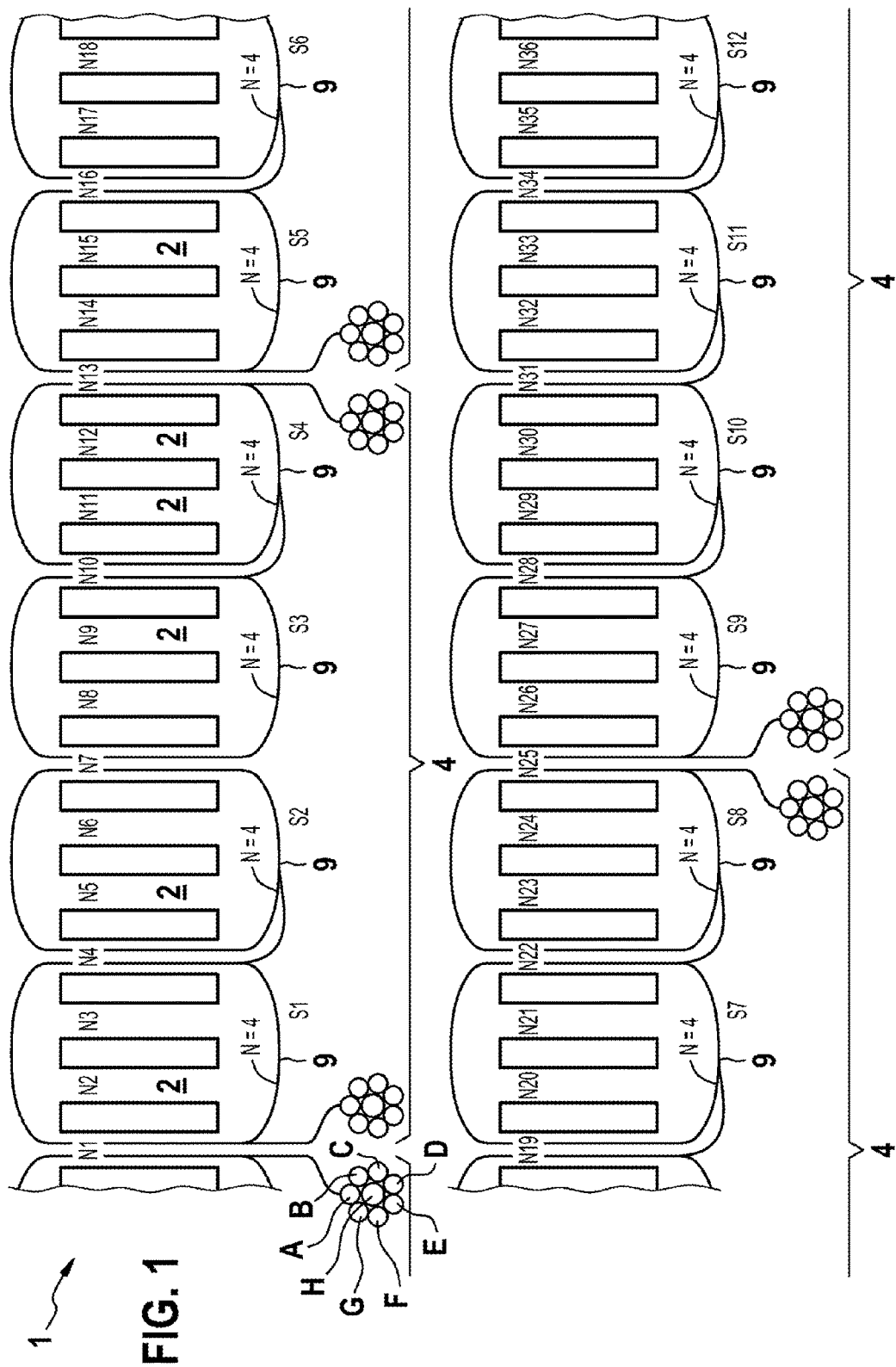
FIG. 1 illustrates a stator of an electric machine having slots, in which winding branches of a single electrical phase of the electrical winding are arranged in accordance with a first exemplary embodiment.

FIG. 1 illustrates a stator 1 of an electric machine in accordance with a first exemplary embodiment, said stator being unwound so as to facilitate the illustration, wherein a first unwound section of the stator 1 having slots 2 (N1 to N18) is illustrated in the upper row and a second unwound section of the stator 1 having slots 2 (N19 to N36) is illustrated in the lower row, said second unwound section of stator 1 being directly adjacent to the right-hand end of the first section of the stator 1. The number of the slots 2 of the stator 1 is expressly arbitrary.

The stator 1 in accordance with the invention comprises a stator laminated yoke that is embodied from a stack of annular magnetic steel laminas and comprises the slots 2 in accordance with FIG. 1. The slots 2 of the stator 1 comprise a slot base 6 and are open towards an axis 5 of the stator 1. Moreover, the slots 2 of the stator 1 are embodied so as to be open towards the end faces of the stator 1.

An electrical pull-in winding in accordance with a first exemplary embodiment according to FIG. 1 to FIG. 5 is provided in the slots 2 of the stator 1. The term 'pull-in winding' is understood to mean an electrical winding whose wires are pulled into the slots 2 of the stator 1 using pulling-in technology. The electrical pull-in winding is a multi-phase winding having by way of example three phases 3. The pull-in winding is embodied in all figures as a loop winding but it can also be a wave winding.

Figure 2:
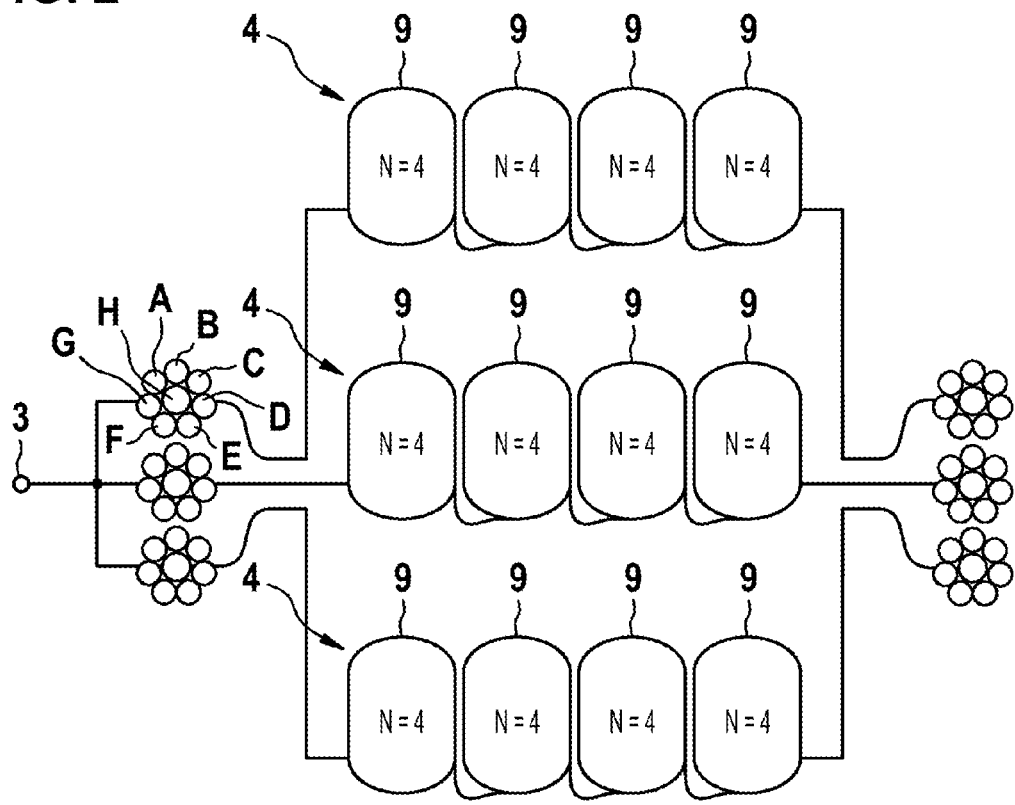
FIG. 2 illustrates three parallel winding branches of the electrical winding in accordance with a first exemplary embodiment according to FIG. 1.
Figure 3:
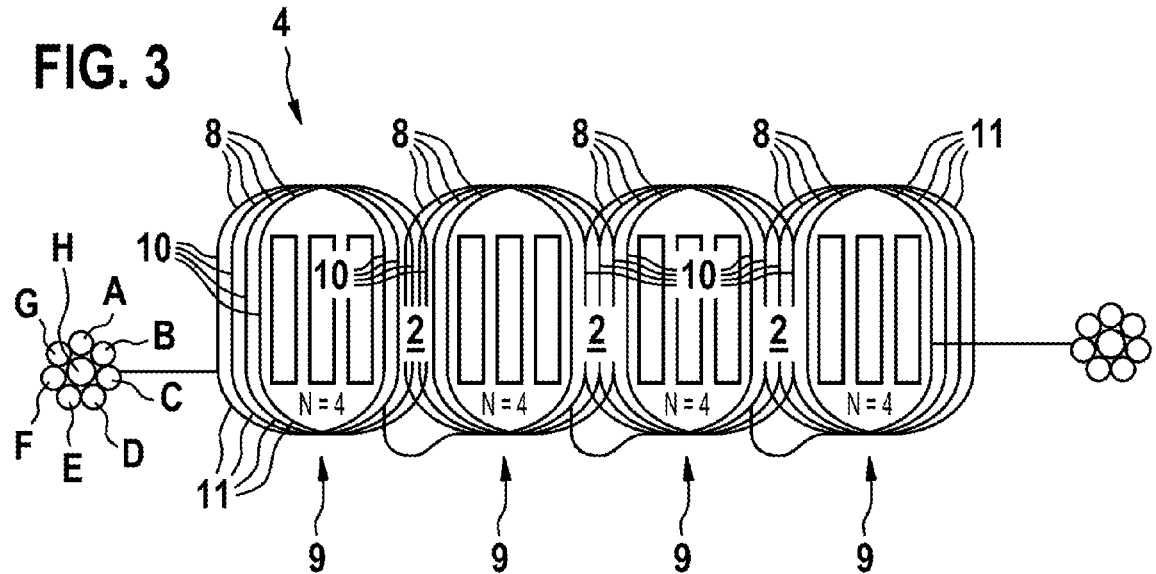
FIG. 3 illustrates a winding branch of the three parallel winding branches according to FIG. 2.

According to FIG. 2, the electrical pull-in winding comprises multiple, by way of example three, winding branches 4 that comprise in each case multiple parallel wires Z=A, B,C etc. and are embodied in each case according to FIG. 3. The winding branches 4 are therefore embodied in each case from a bundle of parallel wires Z, wherein the number of the parallel wires Z is arbitrary. The parallel wires within one winding branch 4 can have different diameters and different cross-sections. Likewise, the parallel wires of one of the winding branches 4 can have different diameters and different cross-sections with respect to at least one other winding branch 4.

According to FIG. 2, at least one winding branch 4 per electrical phase 3 is provided in the electrical pull-in winding. According to the first exemplary embodiment, the pull-in winding comprises three parallel connected winding branches 4 per electrical phase 3. However, for reasons of clarity, only the winding branch 4 of a single phase 3 is illustrated in FIG. 1.

The winding sides 10 of the multiple parallel winding branches 4 can be arranged in the slots 2 in each case in different radial positions with respect to the axis 5, wherein the different radial positions frequently occur by way of example uniformly in each parallel winding branch 4. In this manner, potential differences between the parallel winding branches either do not occur or only small differences occur so that compensating or circuit currents are not produced or only small compensating or circuit currents are produced.

FIG. 3 illustrates by way of example a winding branch of the three parallel winding branches according to FIG. 2. The winding branch 4 forms in its extension in each case multiple coil windings 8 that are in each case part of an electrical coil 9. A coil winding 8 is formed in each case by means of two winding sides 10 of one of the winding branches 4, said winding sides lying in different slots 2, and by means of at least one by way of example two winding side connectors 11 that connect the two winding sides 10 to one another. In the case of a loop winding, a coil winding 8 comprises in each case two winding side connectors 11. The winding branch 4 according to FIG. 3 comprises by way of example four series-connected coils 9, wherein the coils 9 have by way of example in each case a number N of 4 coil windings 8. However, the coils 9 can also have a different number N of coil windings 8 in one winding branch 4. In order to simplify the illustration, the multiple coil windings 8 of the winding branch 4 are not illustrated in FIG. 1 and FIG. 2.

The number of winding branches 4, the number of coils 9 and the number N of the coil windings 8 of the coils 9 is expressly arbitrary.

The three parallel winding branches 4 according to FIG. 2 are distributed in FIG. 1 over specific slots 2 of the stator 1 and are allocated jointly to one of the electrical phases 3.

Figure 4:
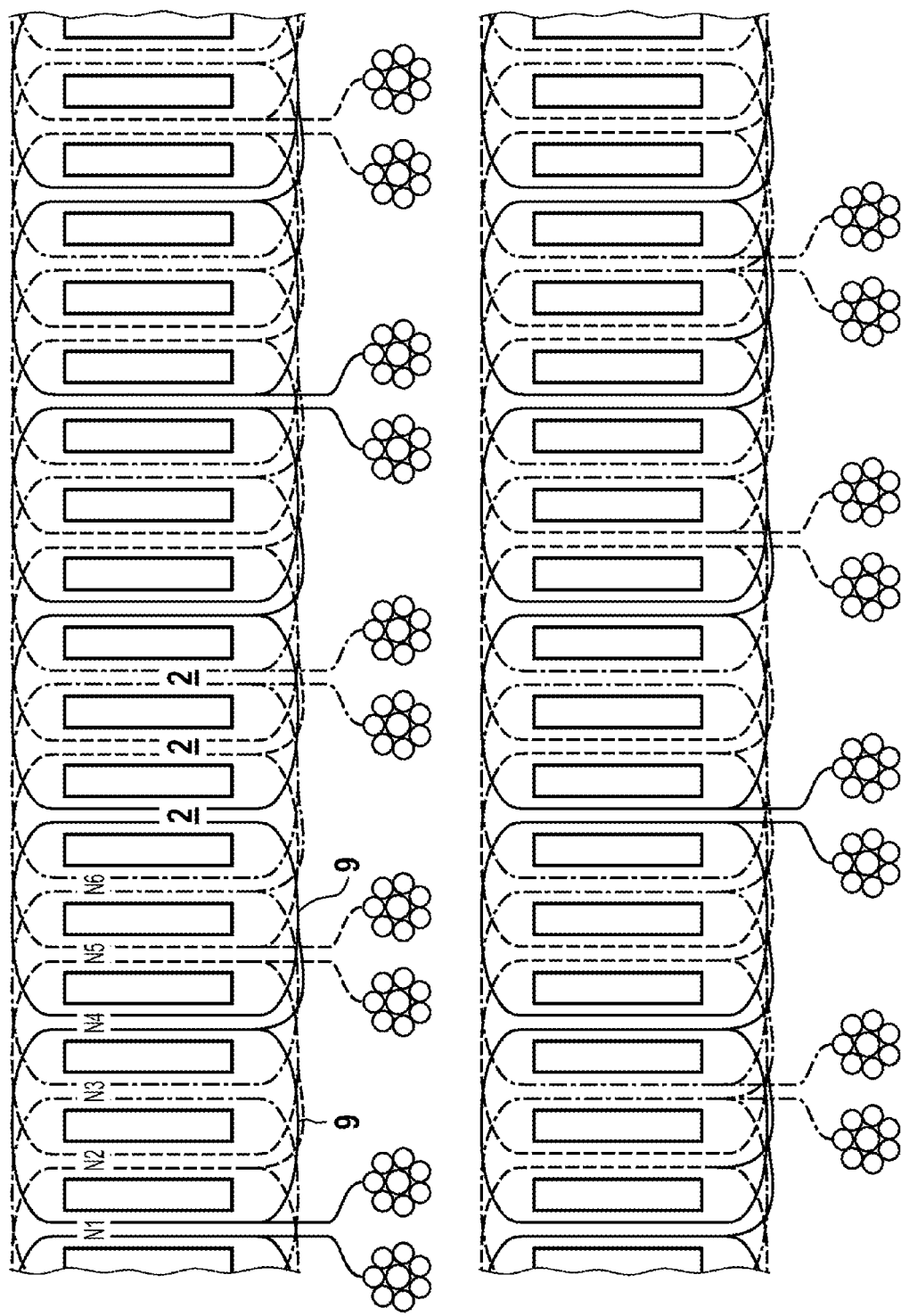
FIG. 4 illustrates a stator of the electric machine having slots, in which the winding branches of three electrical phases in accordance with the first exemplary embodiment are arranged.

FIG. 4 illustrates how according to the first exemplary embodiment nine winding branches 4 according to FIG. 3 are distributed over the slots 2 of the stator 1. Three parallel winding branches 4 according to FIG. 2 are provided three times and in each case allocated to an individual electrical phase 3. The winding branches in FIG. 4 that are illustrated by a continuous line belong to a first phase 3, the winding branches in FIG. 4 that are illustrated by a dashed line belong to a second phase 3 and the winding branches in FIG. 4 that are illustrated by dot-dashed line belong to a third phase 3.

Figure 5:
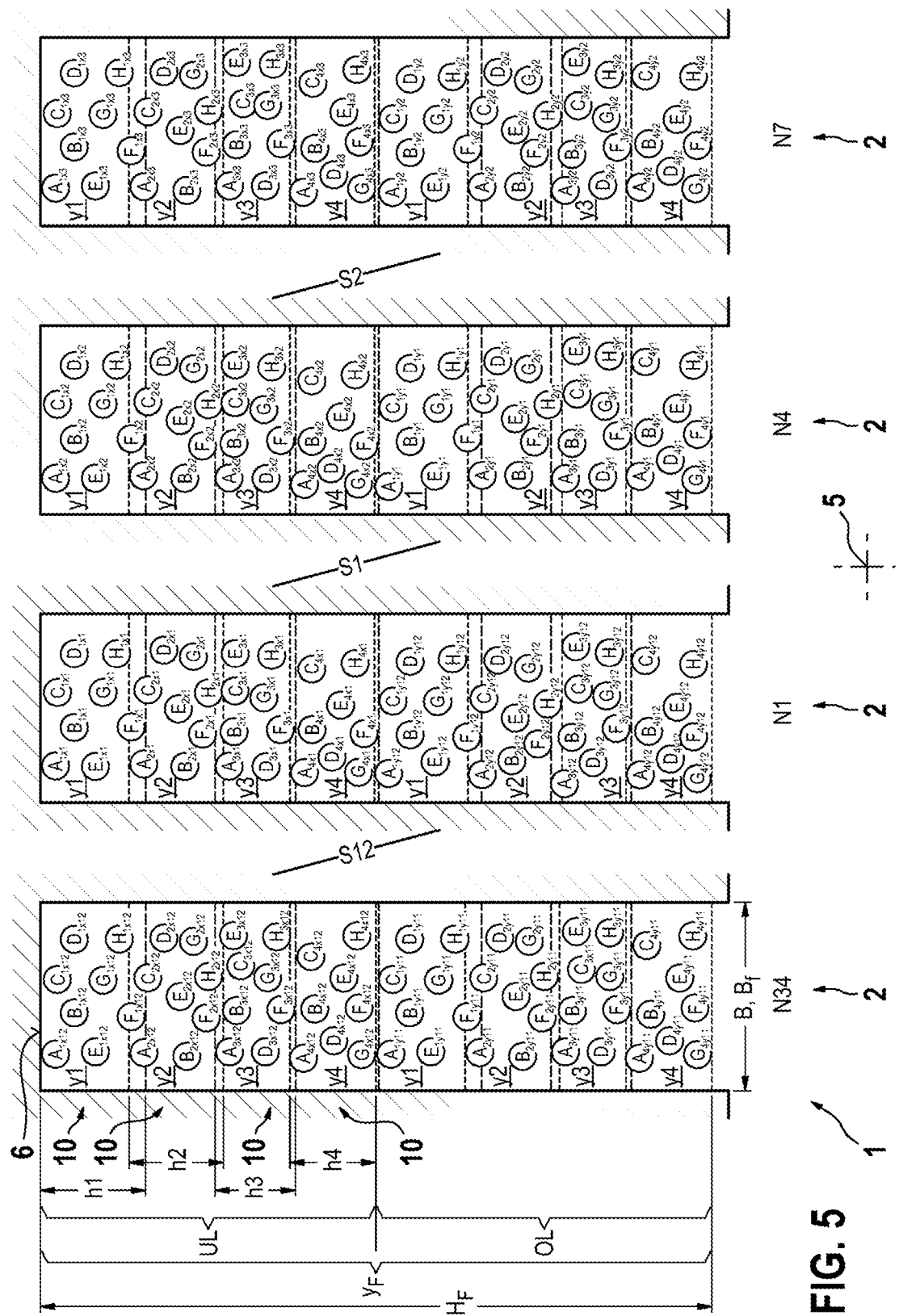
FIG. 5 illustrates a sectional view of four slots in which the parallel wires of the electrical winding are arranged in accordance with the first exemplary embodiment.

FIG. 5 illustrates a sectional view of four slots of the stator 1 in which the parallel wires Z of a pull-in winding are arranged in accordance with the first exemplary embodiment.

Figure 6:
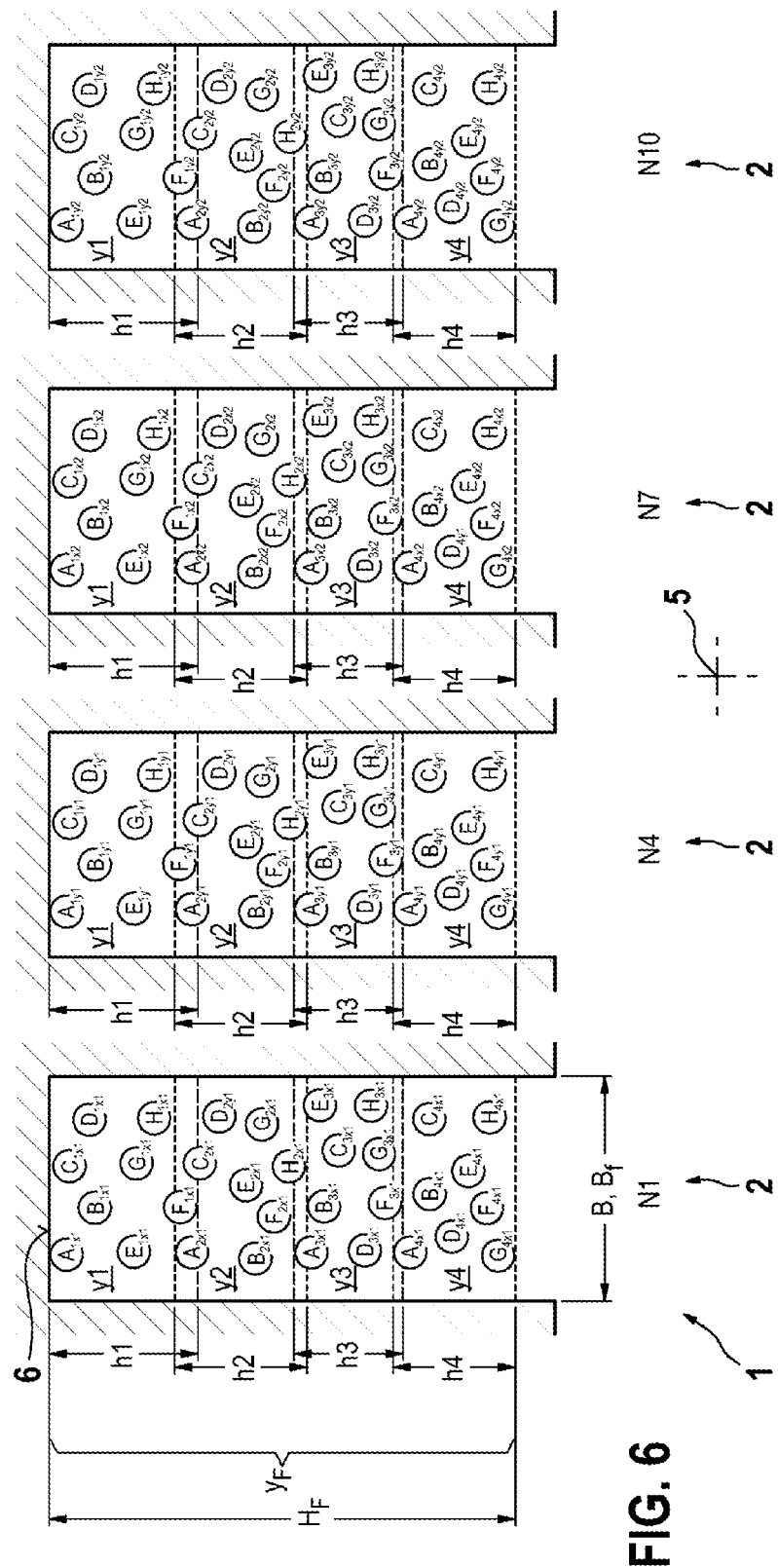

The parallel wires Z=A,B,C of the winding sides 10 have in FIG. 5 and FIG. 6 in each case three indices, wherein the first index indicates the respective continuous numbers of the coil winding 8 in the respective coil 9, the second index indicates the respective winding side 10, namely either X or Y, and the third index indicates the respective coil 9 to which the respective wire belongs. Thus, by way of example, the wire A of the winding side $A_{1x12}$ lies within the slot N34 in the coil winding 8 having the number 1 of the corresponding coil 9,S12 on the winding side $10_x$. The winding side $A_{1Y12}$ that is connected to the winding side $A_{1x12}$ lies within the slot N1 in the coil winding 8 having the number 1 of the same coil 9,S12 on the other winding side $10_Y$.

It is provided in accordance with the invention that in each case the parallel wires Z that are arranged in the same slot 2 are provided in a common slot section $y_f$ of the respective slot 2 having a slot section height $H_f$, wherein the slot section $y_f$ comprises in each case layered regions y1 . . . yn that are arranged one above the other in the radial direction with respect to the axis 5, wherein in each case the wires Z that belong to the same winding side 10 are arranged in the same layered region y1 . . . yn of the slot section $y_f$ of the respective slot 2. The number n of the layered regions y1, . . . yn corresponds to the number N of the winding sides 10 that are arranged in the same slot 2.

Multiple, by way of example eight, winding sides 10 of one or multiple coils 9 are provided in each slot 2 of the stator 1. The winding sides 10 of an individual slot 2 that are allocated to a first coil 9 can be arranged in a common lower layer UL that is facing the slot base 6, and the winding sides 10 of the same slot 2 that are allocated to a second coil 9 are arranged in a common upper layer OL of the slot section $y_f$, said upper layer being remote from the slot base 6 or conversely. A so-called two-layer pull-in winding is formed by means of this arrangement, in the case of this arrangement the upper layer and the lower layer form two layers and in the case of this arrangement in each case winding sides 10 of two coils 9 are provided in the slots 2. These two coils 9 can belong in each case to the same winding branch 4 or to different winding branches 4. In accordance with the invention, the parallel wires Z are arranged in the lower layer UL or upper layer OL that belong to the same winding side 10, in the same layered region y1 . . . yn of the lower layer or upper layer of the respective slot 2.

The winding sides 10, $10_X$, $10_Y$ of the same coil 9 are distributed over two slots 2 by way of example in such a manner that the winding sides 10 are arranged in the one slot 2 in the upper layer OL and in the other slot 2 in the lower layer UL, wherein the sequence of the winding sides 10 in the two layers, UL, OL is by way of example identical. In accordance with the embodiment according to FIG. 5, the sequence of the winding sides 10 within a slot section $y_f$ is provided so that winding sides 10 of coil windings 8 that directly follow one another and are of the same coil 9 are arranged in each case in adjacent layered regions y1 . . . yn. The winding sides 10 of a slot section $y_f$ can however be arranged expressly in any arbitrary sequence within the slot section $y_f$.

In accordance with the first exemplary embodiment, in each case eight winding sides 10 having in each case eight parallel wires Z are provided in the slot N1 and the slot N4 of FIG. 5. The number of winding sides 10 per slot 2 is expressly arbitrary. The winding sides 10 that are arranged in a common slot 2 can be allocated to the identical or different electrical phases 3.

In accordance with the exemplary embodiment, four winding sides 10 of the slot N1 that are arranged in the lower layer and four winding sides 10 of the slot N4 that are arranged in the upper layer form a coil S1 together with the corresponding winding side connectors 11. The four winding sides 10 of the slot N1 that lie in the upper layer form a coil S12 together with four winding sides 10 of the slot N34 that are provided in the lower layer and the corresponding winding side connectors 11. Furthermore, four winding sides 10 of the slot N4 that lie in the lower layer form a coil S2 together with four winding sides 10 of the slot N7 that are provided in the upper layer and the corresponding side connectors 11.

The layered regions y1, . . . yn have in each case a radial height h1, . . . hn that is smaller than or equal to a value that is calculated from a factor F multiplied by the ratio of the respective slot section height $H_f$ to the number n of the layered regions y1, . . . yn of the corresponding slot section $y_f$. The factor F lies in the range between 1.1 and 2. The number n of the layered regions y1, . . . yn of the respective slot section $y_f$ corresponds to the number N of the winding sides 10 that are arranged in the same slot 2. In accordance with the exemplary embodiment according to FIG. 5, four winding sides 10 of the coil S12 are provided in the slot N1 in the upper layer and four winding sides 10 of the coil S1 are provided in the lower layer so that the number n of the layered regions y1, . . . yn of the slot N1 amounts to eight.

The factor F is calculated from the formula F=1.1+0.05*(n−2). The radial height h1 . . . hn of the layered regions y1 . . . yn is measured in each case from the highest point of the uppermost wire to the lowest point of the lowermost wire of the respective layered region y1 . . . yn. The layered region y1, . . . yn comprises by way of example a rectangular cross-section by way of example over the entire axial length of the slot 2. The layered region y1, . . . yn has in each case a width $B_f$ that corresponds to the width B of the slots 2, where appropriate less the thickness of a slot insulation, not illustrated, that is arranged in the slot 2 and/or less air gaps that are present between the slot 2 and the slot insulation.

Adjacent layered regions y1 . . . yn can overlap with one another to a maximum extent at a predetermined percentage P of their radial height h1 . . . hn. This also applies for adjacent layered regions y1 . . . yn between the upper layer OL and the lower layer UL. This percentage P is calculated from the formula P=F−1. The overlapping of said layered regions occurs since the wires of the electrical winding can only be inserted into the slots 2 in an ideal manner with great difficulty using mechanical pulling-in technology. For this reason, a certain amount of overlapping of the layered regions y1 . . . yn is permitted, which has only a very small effect on the additional copper losses. The overlapping of the layer regions y1 . . . yn is illustrated in FIG. 5 and FIG. 6 by means of the two differently dashed dividing lines between two layered regions y1 . . . yn.

FIG. 6 illustrates a sectional view of four slots of the stator 1 in which the parallel wires Z of a pull-in winding are arranged in accordance with a second exemplary embodiment.

The second exemplary embodiment differs with respect to the first exemplary embodiment in that only winding sides 10 of a single coil 9 are provided in each slot 2.

It also applies for the pull-in winding in accordance with the second exemplary embodiment that in each case the parallel wires Z that are arranged in the same slot 2 are provided in the common slot section $y_f$ of the respective slot 2 having a slot section height $H_f$, wherein the slot section $y_f$ comprises in each case layered regions y1 . . . yn that are arranged one above the other in the radial direction with respect to the axis 5, wherein in each case the wires Z that belong to the same winding side 10 are arranged in the same layered region y1 . . . yn of the slot section $y_f$ of the respective slot 2.

In accordance with the second exemplary embodiment in each case four winding sides 10 having in each case eight parallel wires Z are provided in the slot N1 and the slot N4 of FIG. 6. The number of winding sides 10 per slot 2 is expressly arbitrary. In accordance with the exemplary embodiment, the four winding sides 10 of the slot N1 and the four winding sides 10 of the slot N4 form a coil S1 together with the corresponding winding side connectors 11. The four winding sides 10 of the slot N7 form a coil S2 together with the four winding sides 10 of the slot N10 and the corresponding winding side connectors 11.

FIG. 7 illustrates a stator 1 of an electric machine in accordance with the second exemplary embodiment according to FIG. 6, said stator being unwound so as to facilitate the illustration, wherein a first unwound section of the stator 1 having slots 2 (N1 to N18) is illustrated in the upper row and a second unwound section of the stator 1 having slots 2 (N19 to N36) is illustrated in the lower row, said second unwound section being directly adjacent to the right-hand end of the first section of the stator 1.

In accordance with the second exemplary embodiment, three parallel-connected winding branches 4 are provided in the electrical pull-in winding per electrical phase 3. However, for reasons of clarity, only the winding branches 4 of a single phase 3 are illustrated in FIG. 7. The winding branches 4 comprise in accordance with the second exemplary embodiment two series-connected coils 9, wherein the coils 9 have by way of example in each case 4 coil windings 8. The number of the winding branches 4, the number of coils 9 and the number of the coil windings 8 of the coils 9 is however expressly arbitrary.

What is claimed is:

1. A stator, said stator comprising slots (2) that are open towards an axis (5) of the stator (1) and having an electrical pull-in winding that comprises multiple winding branches (4) that comprise in each case multiple parallel wires (Z=A, B,C etc.) that are arranged in the slots (2), wherein the winding branches (4) form in their extension in each case multiple coil windings (8) that are in each case part of an electrical coil (9), wherein a coil winding (8) is formed in each case by two winding sides (10) of one of the winding branches (4), said winding sides lying in different slots (2) and wherein a coil winding (8) is formed in each case by at least one winding side connector (11) that connects the two winding sides (10) to one another, characterized in that the parallel wires (Z) are arranged in the same slot (2), are provided in each case in a common slot section (yf) of the respective slot (2) having a slot section height (Hf), wherein the slot section (yf) comprises in each case layered regions (y1 . . . yn) that are arranged one above the other in a radial direction, wherein in each case the parallel wires (Z) that belong to the same winding side (10) are arranged in the same layered region (y1 . . . yn) of the slot section (yf), wherein the layered region (y1, . . . yn) comprises in each case a radial height (h1, . . . hn) that is smaller than a value that is calculated from a factor (F) multiplied by the ratio of the slot section height (Hf) with respect to the number (n) of the layered regions (y1, . . . yn) per slot section (y), wherein adjacent layered regions (y1 . . . yn) overlap one another to a maximum extent at a predetermined percentage of their radial height (h1 . . . hn) corresponding to the factor, wherein the factor (F) lies in the range between 1.1 and 2 and the number (n) of the layered regions (y, . . . yn) per slot section (yf) corresponds to the number (N) of the winding sides (10) that are arranged in the same slot (2), and wherein the factor (F) is calculated from the formula F=1.1+0.05*(n−2).

2. The stator as claimed in claim 1, characterized in that the layered region (y1, . . . yn) comprises in each case a width ($B_f$) that corresponds to the width (B) of the slots (2), where appropriate less the thickness of a slot insulation and/or less air gaps that are present between the slot and the slot insulation.

3. The stator as claimed in claim 1, characterized in that in each case multiple winding sides (10) of two coils (9) are provided in a slot (2), wherein the winding sides (10) of the first coil (9) are arranged in a common lower layer (UL) and the winding sides (10) of the second coil (9) are arranged in a common upper layer (OL) of the slot section ($y_f$) or conversely.

4. The stator as claimed in claim 3, characterized in that the two coils (9) belong in each case to the same winding branch (4) or different winding branches (4).

5. The stator as claimed in claim 1, characterized in that each winding branch (4) forms one or multiple series-connected electrical coils (9).

6. The stator as claimed in claim 1, characterized in that multiple parallel winding branches (4) of the same phase are provided and the winding sides (10) of said winding branches are arranged in the slots (2) in each case in different radial positions, wherein the different radial positions frequently occur uniformly in each parallel winding branch (4).

7. An electric machine having a stator as claimed in claim 1.

* * * * *